Oct. 25, 1932.  C. E. WERTMAN  1,884,443
CHAIN RIVETING MACHINE
Filed May 23, 1931   2 Sheets-Sheet 1
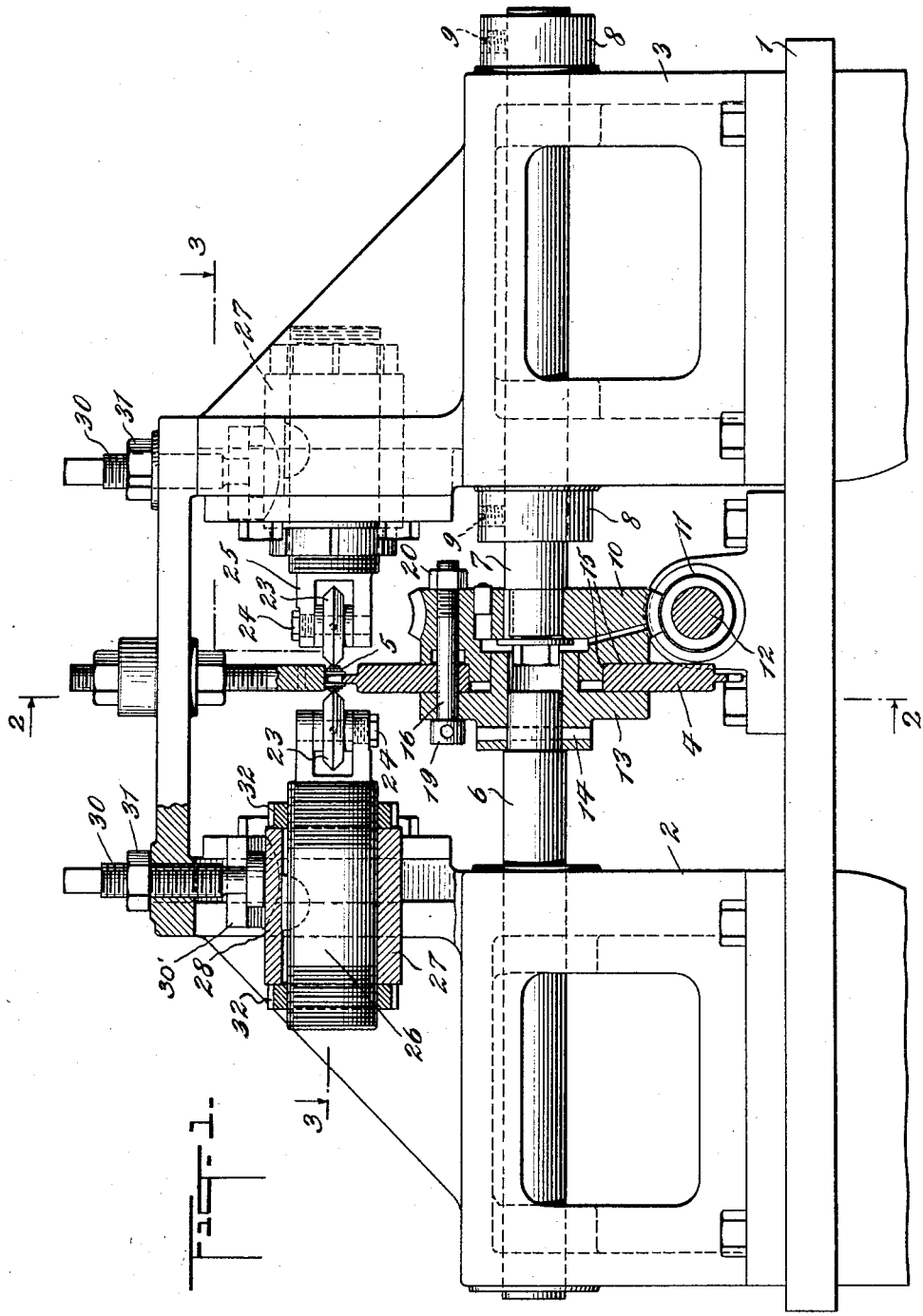
INVENTOR
Charles E. Wertman
BY
Gifford, Scull & Burgess
ATTORNEYS.

Oct. 25, 1932.  C. E. WERTMAN  1,884,443
CHAIN RIVETING MACHINE
Filed May 23, 1931   2 Sheets-Sheet 2
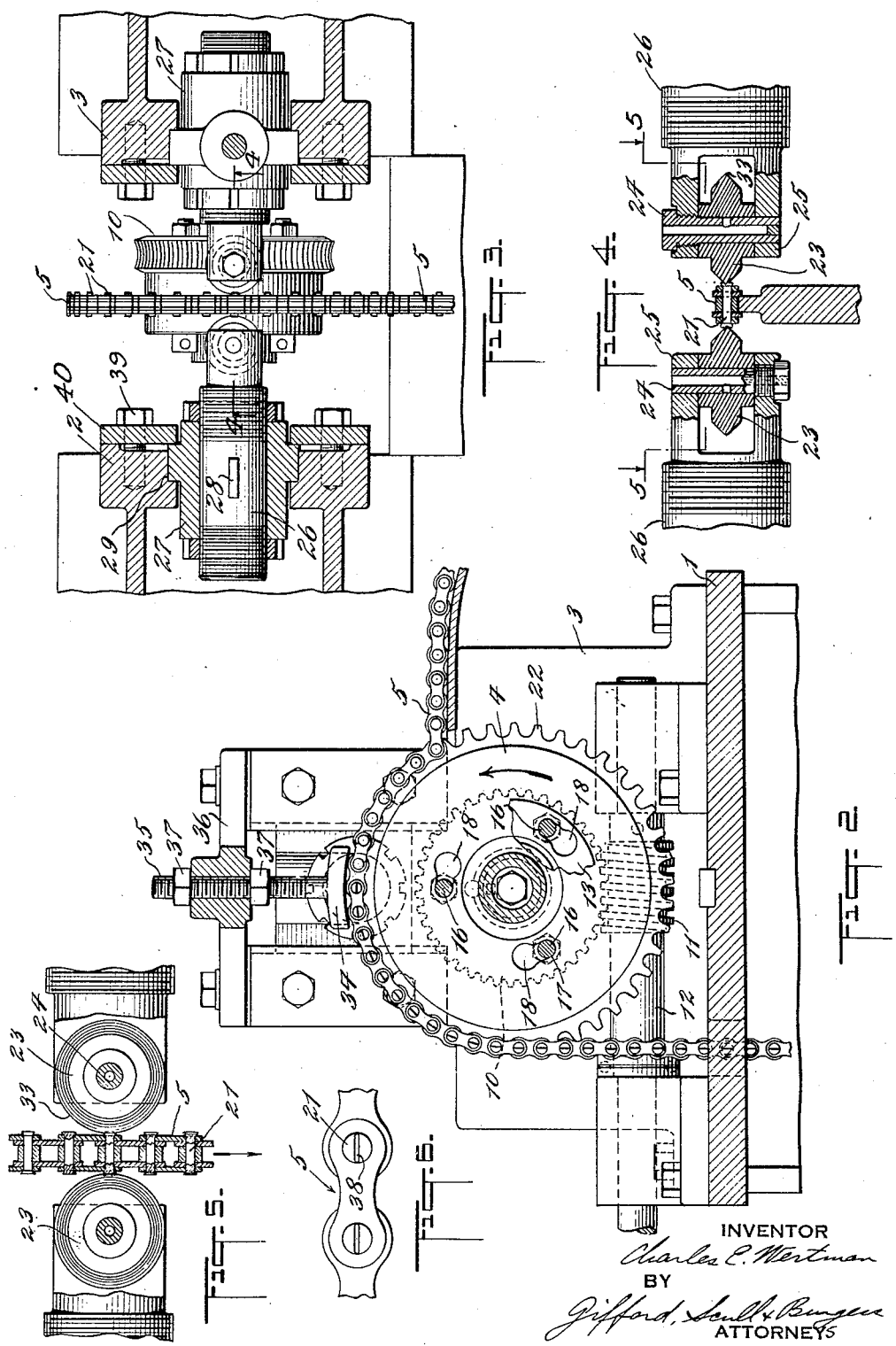
INVENTOR
Charles E. Wertman
BY
Gifford, Scull & Burgess
ATTORNEYS Patented Oct. 25, 1932

1,884,443

UNITED STATES PATENT OFFICE

CHARLES E. WERTMAN, OF HARTFORD, CONNECTICUT, ASSIGNOR TO THE WHITNEY MFG. CO., OF HARTFORD, CONNECTICUT, A CORPORATION OF CONNECTICUT

CHAIN RIVETING MACHINE

Application filed May 23, 1931. Serial No. 539,508.

This invention relates to a novel and improved form of chain riveting machine, the novel features of which will be best understood from the following description and the annexed drawings, in which I have shown a selected embodiment of the invention, and in which:

Fig. 1 is a transverse view, partly in section and partly in elevation, through a machine embodying this invention;

Fig. 2 is a view on the line 2—2 of Fig. 1;

Fig. 3 is a view on the line 3—3 of Fig. 1;

Fig. 4 is a view on the line 4—4 of Fig. 3;

Fig. 5 is a view on line 5—5 of Fig. 4;

Fig. 6 is a detail view showing the result of the operation of my invention upon a machine for nicking chain pins.

According to the embodiment of the invention illustrated herein, the machine is provided with a suitable base 1, upon which is mounted a frame formed of standards 2 and 3 spaced apart on the base, and between which is rotatably mounted a sprocket 4 which is used to move a chain 5 upon which work is to be performed. The sprocket is shown as mounted between two shafts 6 and 7, which are mounted respectively in the standards 2 and 3, suitable bearings being, of course, provided for rotatably supporting the shafts. The shaft 7 is secured in its bearings against longitudinal movement as by means of collars 8 secured to the shaft by usual screws 9. On the inner end of the shaft 7 is mounted a worm gear 10 meshing with a worm 11 on a shaft 12 supported on the base and rotated by any suitable mechanism which is not shown in these drawings.

The shaft 6 is mounted in suitable bearings in the standard 2, and is preferably left so that it may move lengthwise in such bearings. The shaft 6 is provided at its inner end with a hub 13 pinned to the shaft as indicated at 14, and between the hub 13 and the gear 10 is disposed the sprocket 4. It will be seen that suitable seats are provided for the sprocket to hold it coaxial and concentric with the two shafts 6 and 7. In the illustrated form, these seats are indicated at 15 in the gear 10, the face of the hub 13 being left flat to hold the sprocket in the seats 15.

Bolts 16 pass through alined openings in the hub and sprocket and through holes in the gear. The holes in the gear may be of such size as to closely fit the bolts, whereas the openings in the sprocket and the hub are of the form shown in Fig. 2. Each of these openings has a reduced portion 17 to fit the body of the bolt, and an enlarged portion 18 of sufficient diameter that the head 19 of the bolt may pass therethrough. By this arrangement, it will be seen that, when the nuts 20 on the bolts are loosened, the shaft 6, together with the hub 13 and the sprocket 4, may be given a slight rotation to bring the heads 19 of the bolts into line with the portions 18 of the openings, and then the shaft 6, together with the hub and sprocket, may be slid lengthwise of the shaft 6, without further disturbing the bolts. The bolts are then in position to act as guiding means for the placing of the same or another sprocket. This arrangement provides a ready and convenient way by which the sprocket may be changed to one having different pitch.

It will be seen that the sprocket will move continuously, and consequently will move the chain with a continuous action. The chain shown is of the type having transversely extending pins 21. The machine covered by this application is intended to nick or spread the ends of the pins or rivets. It is to be understood that the chain has been previously assembled with the links and pins in proper relation and secured by proportionately heavy pressure, the spreading of the ends giving a more complete and permanent lock. The chain thus assembled is fed through the machine of this application by engagement between the teeth 22 on the sprocket and the chain.

Up to the present time, nicking or spreading of the pin ends has been done by reciprocating chisels, but many difficulties are attendant upon such an arrangement. In the first place, because of the intermittent movement, the timing must be accurate so that the chisels will accurately engage the ends of the pins. Moreover, the parts must be accurately arranged so that the chisels will stop their movement toward the chain at exactly the right point so as to avoid damage to the chain. Then, of course, the cutting surface of the chisels is limited, and their edges and also the edges of the operating cams must be hardened, all of which makes an expensive procedure.

According to my invention, I perform the nicking or spreading action by means of revolving knives 23, here shown as mounted on opposite sides of the sprocket, although it is to be understood that if only one end of the pin is to be nicked, then only one knife will be used. Each knife is mounted on a vertical shaft 24, upon which it rotates, and is shown as mounted within a forked end 25 of a head 26. Each head 26 is slidably mounted in a jacket 27 to which it is keyed as indicated at 28, so that the knife is always held in correct position, this position being such that the axis of the shaft 24 is radial with respect to the sprocket or normal to the axis of rotation of the sprocket. The shaft is slidably mounted in guides 29 in the standards 2 and 3, respectively, and is held in adjusted vertical position by means of adjustment screws 30, which are shown as being threaded in the standard and held in place by nuts 31. Each screw has a T head loosely operating in a corresponding slot 30' in the jacket, thus permitting rotation of the screw to raise or lower the jacket, without rotation of the jacket. After vertical adjustment by screws 30 has been accomplished, the jacket is bolted rigidly to the frame by bolts 39 and flat gibs 40. Adjustment of the head towards and from the sprocket may be accurately made by threaded engagement between the head and nuts 32, which are disposed at opposite ends of the jacket 27. By proper manipulation of these nuts, it will be obvious that the knife may be accurately positioned.

Each knife is preferably circular in cross section, and is provided with a continuous cutting edge 33. It will be seen that, as the chain is moved by the sprocket, the knife edges will contact with the ends of the pins 21, this contact causing rotation of the knives and at the same time nicking or cutting of the pins. During this operation, the chain may be held upon the sprocket by a shoe 34 mounted on a stem 35 threaded into the top 36 of the frame, and held in position by locking nuts 37. The chain may be stripped from the sprocket by a stripper or allowed to leave the sprocket by gravity as shown in Fig. 2.

In Fig. 6 is shown a section of chain after the pins have been nicked, as shown at 38, this nicking spreading them so as to hold the parts of the chain securely together.

While I have shown the invention as embodied in a specific form, it is to be understood that various changes in details may be made without departing from the scope of the invention, and I therefore do not intend to limit myself except by the appended claims.

I claim:

1. In a device of the class described, means for continually moving through the device a chain having pins connecting adjacent links, and means for cutting the ends of said pins during said continuous movement.

2. In a device of the class described, means for continually moving through the device a chain having pins connecting adjacent links, and a knife movable by movement of the chain and positioned to cut the end of each pin during its movement.

3. In a device of the class described, means for continually moving through the device a chain having pins connecting adjacent links, and a rotatable knife positioned to cut the end of each pin during its movement.

4. In a device of the class described, means for continually moving through the device a chain having pins connecting adjacent links, a knife movable by movement of the chain and positioned to cut the end of each pin during its movement, and means for adjusting said knife longitudinally of said pins.

5. In a device of the class described, a spocket, means for continually rotating said sprocket, said sprocket having teeth adapted to engage a chain having transversely extending pins, and means to cut the ends of said pins during the continual movement of said chain.

6. In a device of the class described, a rotatable sprocket having teeth adapted to engage a chain, said chain having pins extending transversely thereof, and a rotatable knife disposed adjacent the periphery of said sprocket and in position to cut the end of said pins as the sprocket moves the chain by the knife.

7. In a device of the class described, a rotatable sprocket having teeth adapted to engage a chain, said chain having pins extending transversely thereof, a rotatable knife disposed adjacent the periphery of said sprocket and in position to cut the end of said pins as the sprocket moves the chain by the knife, and means to adjust said knife parallel to the axis of rotation of said sprocket and also normal thereto.

8. In a device of the class described, a rotatable sprocket having teeth adapted to engage a chain, said chain having pins extending transversely thereof, a rotatable knife disposed adjacent the periphery of said sprocket and in position to cut the end of said pins as the sprocket moves the chain by the knife, and a shoe disposed adjacent said knife and engaging the chain to hold it in position on the sprocket while the knife is operating thereon.

9. In a device of the class described, a rotatable sprocket having teeth adapted to engage a chain, said chain having pins extending transversely thereof, and rotatable knives disposed adjacent the periphery of said sprocket and on opposite sides of said chain and in position to cut the opposite ends of said pins as the sprocket moves the chain by the knives.

10. In a device of the class described, a base having a frame thereon, a sprocket rotatably mounted in said frame and having teeth adapted to engage a chain with transversely extending pins, a roller knife mounted adjacent the periphery of said sprocket and on an axis at right angles to the sprocket axis and in position to engage said pins as the sprocket moves the chain, said movement of the chain causing the knife to rotate.

11. In a device of the class described, a base having a frame thereon, a sprocket rotatably mounted in said frame and having teeth adapted to engage a chain with transversely extending pins, a roller knife mounted adjacent the periphery of said sprocket and on an axis at right angles to the sprocket axis and in position to engage said pins as the sprocket moves the chain, said movement of the chain causing the knife to rotate, and means for adjusting said roller knife towards and away from the sprocket and also parallel to the axis of the roller.

12. In a device of the class described, two alined shafts, a hub on one of said shafts and a gear on the other, said hub and gear being disposed adjacent each other, a second gear constantly meshing with said first-named gear, a sprocket disposed between said gear and hub and adapted to move a chain having transversely extending pins, a knife disposed in position to cut the ends of said pins during movement of the chain by the sprocket, means for detachably securing the gear, sprocket, and hub together, and means preventing movement of the gear shaft lengthwise of its axis, said other shaft being movable lengthwise of its axis when said securing means are loosened, whereby said sprocket may be removed and replaced.

13. In a device of the class described, two alined shafts, a hub on one of said shafts and a gear on the other, said hub and gear being disposed adjacent each other, a second gear constantly meshing with said first-named gear, a sprocket disposed between said gear and hub and adapted to move a chain having transversely extending pins, a knife disposed in position to cut the ends of said pins during movement of the chain by the sprocket, bolts passing through holes in said gear and through openings in the sprocket, said openings having portions closely fitting said bolts and other portions larger than the heads on the bolts and disposed so that turning of the sprocket will bring said heads into registry with said larger portions, and means preventing movement of the gear shaft lengthwise of its axis, said other shaft being movable lengthwise of its axis when said securing means are loosened, whereby said sprocket may be removed and replaced.

14. In a device of the class described, two alined shafts, a hub on one of said shafts and a gear on the other, said hub and gear being disposed adjacent each other, a second gear constantly meshing with said first-named gear, a sprocket disposed between said gear and hub and adapted to move a chain having transversely extending pins, a knife disposed in position to cut the ends of said pins during movement of the chain by the sprocket, bolts passing through holes in said gear and through openings in the sprocket and hub, said openings having portions closely fitting said bolts and other portions larger than the heads on the bolts and disposed so that turning of the sprocket and hub will bring said heads into registry with said larger portions, and means preventing movement of the gear shaft lengthwise of its axis, said other shaft being movable lengthwise of its axis when said securing means are loosened, whereby said sprocket may be removed and replaced.

15. In a device of the class described, a sprocket adapted to engage a chain, said chain having transversely extending pins connecting adjacent links, a knife positioned to act upon said pins as the sprocket moves the chain, means to rotatably support said sprocket, driving means for said sprocket, means to detachably hold said sprocket in position, said means being arranged to permit removal of the sprocket without disturbing the driving means, and means for adjusting said knife towards or away from the axis of rotation of the sprocket.

CHARLES E. WERTMAN.